(12) United States Patent
Belleh

(10) Patent No.: US 9,877,588 B2
(45) Date of Patent: Jan. 30, 2018

(54) FRONT FACING SITTING PILLOW

(71) Applicant: Waleed A. Belleh, Moreno Valley, CA (US)

(72) Inventor: Waleed A. Belleh, Moreno Valley, CA (US)

( * ) Notice: Subject to any disclaimer, the term of this patent is extended or adjusted under 35 U.S.C. 154(b) by 45 days.

(21) Appl. No.: 14/531,161

(22) Filed: Nov. 3, 2014

(65) Prior Publication Data

US 2016/0120326 A1    May 5, 2016

(51) Int. Cl.
| | |
|---|---|
| A47C 16/00 | (2006.01) |
| A47C 7/38 | (2006.01) |
| A47G 9/10 | (2006.01) |
| B60N 2/48 | (2006.01) |
| B64D 11/00 | (2006.01) |

(52) U.S. Cl.
CPC ............. *A47C 16/00* (2013.01); *A47C 7/38* (2013.01); *B60N 2/4805* (2013.01); *B60N 2002/4894* (2013.01)

(58) Field of Classification Search
CPC ........ A47G 9/1054; A47C 16/00; A47C 7/383
See application file for complete search history.

(56) References Cited

U.S. PATENT DOCUMENTS

| | | | |
|---|---|---|---|
| 454,100 A | 6/1891 | Wilson | |
| 2,107,962 A * | 2/1938 | Sheasby | A47C 20/026 5/189 |
| 3,220,771 A | 2/1965 | Doss, Sr. | |
| 3,544,161 A | 12/1970 | Bryden | |
| 3,754,787 A | 8/1973 | Garber | |
| 4,662,361 A | 5/1987 | Patterson | |
| 4,971,040 A | 11/1990 | Gillotti | |
| 5,294,027 A * | 3/1994 | Plastina | A61G 5/10 220/6 |
| 5,401,078 A | 3/1995 | Riach | |
| 5,762,402 A | 6/1998 | Gillotti | |
| 5,971,485 A * | 10/1999 | Clark | A61G 13/009 297/195.11 |
| 6,397,414 B1 * | 6/2002 | Lloyd | A47C 20/026 297/900 |
| 6,427,273 B1 * | 8/2002 | Berke | A47C 16/00 248/118 |
| 6,684,431 B2 * | 2/2004 | Splane, Jr. | A47C 20/026 248/118 |
| 6,758,447 B2 * | 7/2004 | Tinsley | A61G 13/12 248/118 |

(Continued)

*Primary Examiner* — David R Dunn
*Assistant Examiner* — Tania Abraham
(74) *Attorney, Agent, or Firm* — Kirk A. Buhler; Buhler & Associates

(57) ABSTRACT

Improvements in a front facing sitting pillow that mounts or sits on a table desk or tray. For people that are in a restricted seat, like on an airplane seat, the person in a seat has limited access to the floor or other structure. From an airplane seat a person has a fold-down tray where the person can place items for work or leisure use. The front facing sitting pillow is adjustable to accommodate different geometry of users and place the pillow at a position where the pillow is essentially neutral when the person is resting to prevent neck stain as they rest. The sides can be moved further apart or set at an angle to accommodate the desire of a person that is resting. The pillow(s) are covered with a cushioned fabric material that is removable to allow them to be cleaned, or replaced.

8 Claims, 6 Drawing Sheets

(56) References Cited

U.S. PATENT DOCUMENTS

| | | | | |
|---|---|---|---|---|
| 6,857,149 B2 * | 2/2005 | Hoggatt | ............... | A47C 20/023 |
| | | | | 5/632 |
| 7,036,168 B1 * | 5/2006 | Knickerbocker | ........ | A47G 9/10 |
| | | | | 5/636 |
| 7,640,609 B2 * | 1/2010 | Roleder | ............... | A47C 20/026 |
| | | | | 5/622 |
| 7,673,836 B2 * | 3/2010 | Wallock | ................ | A47C 16/00 |
| | | | | 248/118 |
| 7,748,064 B2 * | 7/2010 | Hamilton | ............... | A47C 16/00 |
| | | | | 248/118 |
| 8,528,970 B2 * | 9/2013 | Edalati | .................. | A47C 16/00 |
| | | | | 297/163 |
| 8,584,283 B2 * | 11/2013 | Mabry | .................. | A47C 16/00 |
| | | | | 190/2 |
| D696,876 S | 1/2014 | Gatto | | |
| 8,985,693 B2 | 3/2015 | Purpura et al. | | |
| 2012/0012431 A1 * | 1/2012 | Hamilton | ............. | A45C 13/262 |
| | | | | 190/18 A |
| 2013/0232696 A1 * | 9/2013 | Halimi | .................. | A47C 16/00 |
| | | | | 5/640 |
| 2014/0033439 A1 * | 2/2014 | Berhanu | ................ | A47C 16/00 |
| | | | | 5/640 |
| 2014/0346316 A1 * | 11/2014 | Sitzmann | ............ | A01D 46/243 |
| | | | | 248/688 |

* cited by examiner

FRONT FACING SITTING PILLOW

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a front facing sitting pillow. More particularly, the present front facing sitting pillow mounts or sits on a table desk or tray to allow a person to lean forward and place their face into the pillow. The pillow allows a person to sit at a desk, airplane seat or similar, and sleep is a forward facing position.

2. Description of Related Art including information disclosed under 37 CFR 1.97 and 1.98.

When traveling on a bus, plane or train a person typically will lay back or to a side to rest or sleep. Some people choose to rock forward and rest their head in their hands and they place their elbows on a desk, table or tray. This makes it difficult to comfortably sleep and often when a person falls asleep the person loses muscle tension in their arms and the head will drop to wake the person. There have been several patents for supporting a face when a person is laying forward to get a massage, but these patents support and entire body and are not supported or mounted on an existing table or desk.

A number of patents and or publications have been made to address these issues. Exemplary examples of patents and or publication that try to address this/these problem(s) are identified and discussed below.

U.S. Pat. No. 4,662,361 issued May 5, 1987 to Merrill Patterson discloses a Physical Therapy Chair. The chair requires a person the sit on the chair and lean forward to place their forehead on a pad. The person can then get a back massage or adjustment while seated in the chair. While the patent allows a person the sit in the chair and lay forward to rest, the invention is not supported on a desk or table and further, the invention does not support the chin to prevent the head from dropping if the person falls asleep.

U.S. Pat. No. 4,971,040 issued Nov. 20, 1990 to Michael A. Gillotti discloses a Portable massage chair. A person places their legs through the chair and lays forward. The chair allows a person to place their chest on the front support and to receive a back massage. While the patent provides support for the chest of a person, the invention is not supported on a desk or table and the invention does not support the chin of a person to prevent the person from slumping down.

U.S. Pat. No. 5,401,078 issued on Mar. 28, 1993 for Linda A. Riach and U.S. Pat. No. 5,762,402 issued on Jun. 9, 1998 to Muchael Gillotti both discloses an Adjustable Therapy or Massage Chair. In these chairs a person kneels forward with the majority of the weight distributed on the shins, posterior and chest. The arms of the user are usually crossed in front of the user. A person places their face in an inverted "U" that supports the forehead of the person getting a massage or therapy. While this allows a person to rest in a forward orientation it is not configured to be supported on a desk table or tray where a traveler can easily carry and transport the face and head of the traveler.

What is needed is a pillow that supports the face and head of a user as they rest in a forward laying orientation. The ideal product rests or mounts on a table, desk or tray. The proposed front facing sitting pillow provides the solution.

BRIEF SUMMARY OF THE INVENTION

It is an object of the front facing sitting pillow to mount or sit on a table desk or tray. For people that are in a restricted seat, like on an airplane seat, the person in a seat has limited access to the floor or other structure. From an airplane seat a person has a fold-down tray where the person can place items for work or leisure use. The front facing pillow is configured to would onto the thin fold-down tray or onto a desk surface to secure the front facing pillow. The front facing sitting pillow has a central opening where a person can read or look through the opening. It is also possible to provide eye shields to block light and therefore provide a darker atmosphere.

It is an object of the front facing sitting pillow to provide support for a person as they lay forward. Because a person does not have any support in a forward position it forces a person into lying against a seat, or resting to a side. With this front facing sitting pillow the person can lean forward where the face of the person can be held in a captured position. The mounting of the front facing sitting pillow on the tray provides a semi-ridged support that not only supports the person from forward motion but also prevents the head from tipping side-to-side when the person falls asleep.

It is another object of the front facing sitting pillow to be adjustable to accommodate different geometry of users. The face of each user can be different from the spacing of the cheeks and from the overall height of a person where they lay forward. The front facing sitting pillow is adjustable to place the pillow at a position where the pillow is essentially neutral when the person is resting to prevent neck stain as they rest. The sides can be moved further apart or set at an angle to accommodate the desire of a person that is resting.

It is still another object of the front facing sitting pillow for the pillow to be cleanable or washable. The pillows are covered with a cushioned fabric material and can be changed to accommodate style, cushion and tactile surface features. The cover is removable to allow them to be cleaned, or replaced. They are essentially socks that slide over the ends of the side supports.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
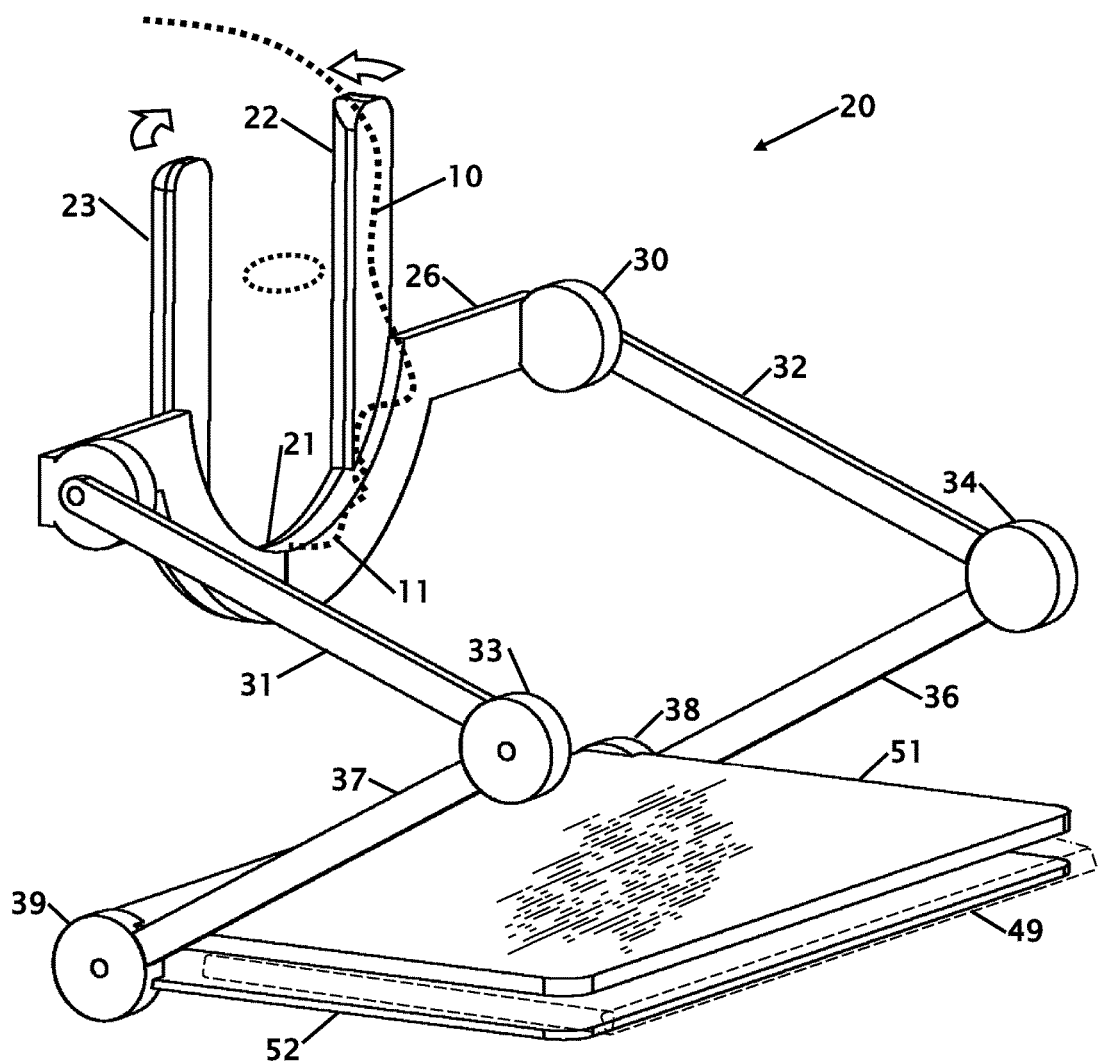
FIG. 1 shows a perspective view of the front facing sitting pillow in use.
Figure 2:
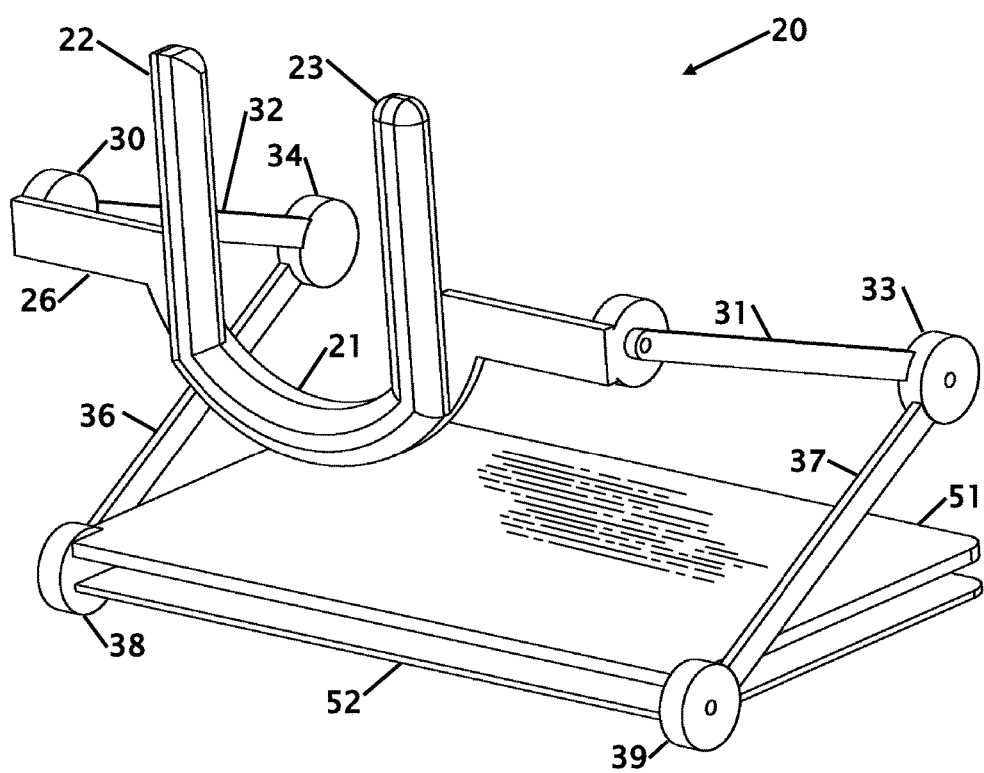
FIG. 2 shows a perspective view of the front facing pillow.

FIG. 1 shows a perspective view of the front facing pillow 20 in use and FIG. 2 shows a perspective view of the front facing pillow. From these figures the user 10 is resting in a forward seated position with the chin 11 of the user 10 placed in the lower "U" 21 of the face pillow 20. Above and on the sides of the lower "U" are cheek pads 22 and 23. The cheek pads 22 and 23 support the front of the face and head 24 to prevent the face and head 24 from drooping forward when the user 10 falls asleep. It is also contemplated to provide eye shields to block light and therefore provide a darker atmosphere to make sleeping easier.

The cheek pads can be configured to cover the eyes to block light or can be configured in an open configuration that allows the user to see in front of the cheek pads 22 and 23 to allow a user 10 to read a book, cell phone, tablet or other item. The front facing pillow 25 is configured as a single solid member or can be configured with articulating cheek pads that can be adjusted to contour to the sides of the face of a user 10. The front of the pillow 20 can be covered with a removable covering 26 that can be removed for cleaning and washing.

The front facing pillow 25 is connected 26 to the remainder of the securing mechanism with a pivoting connection 30 that allows the front facing pillow 25 to rotate to allow the user 10 to set the desired angle where the head/face will be placed to place the user's head at a neutral position to reduce or prevent neck strain as the person rests or sleeps. From the pivoting connection 30 a pair of side arms 31 and 32 extend to rear pivoting joints 33 and 34.

The rear pivoting joints 33 and 34 allow the vertical position of the front facing pillow 25 to be set. From the rear pivoting joints 33 and 34 a set of arms 36 and 37 extend to front pivoting joints. 38 and 39. The combination of arms 31, 32 and 36, 37 allow for both vertical positioning of the front facing pillow 25 and the some front-to-back positioning of the front facing pillow 25 relative to the front 50 of where the front facing pillow 20 is mounted.

From the front pivoting joints 38 and 39 a pair of plates 51 and 52 are positioned to capture and grasp an existing tray 49. When the plates 51 and 52 grasp the tray 49 they are secured to the existing tray 49 to prevent undesired side-to-side movement and rotation that might prevent the front facing pillow 20 from becoming accidentally dislodged from the existing tray 49.

Figure 3:
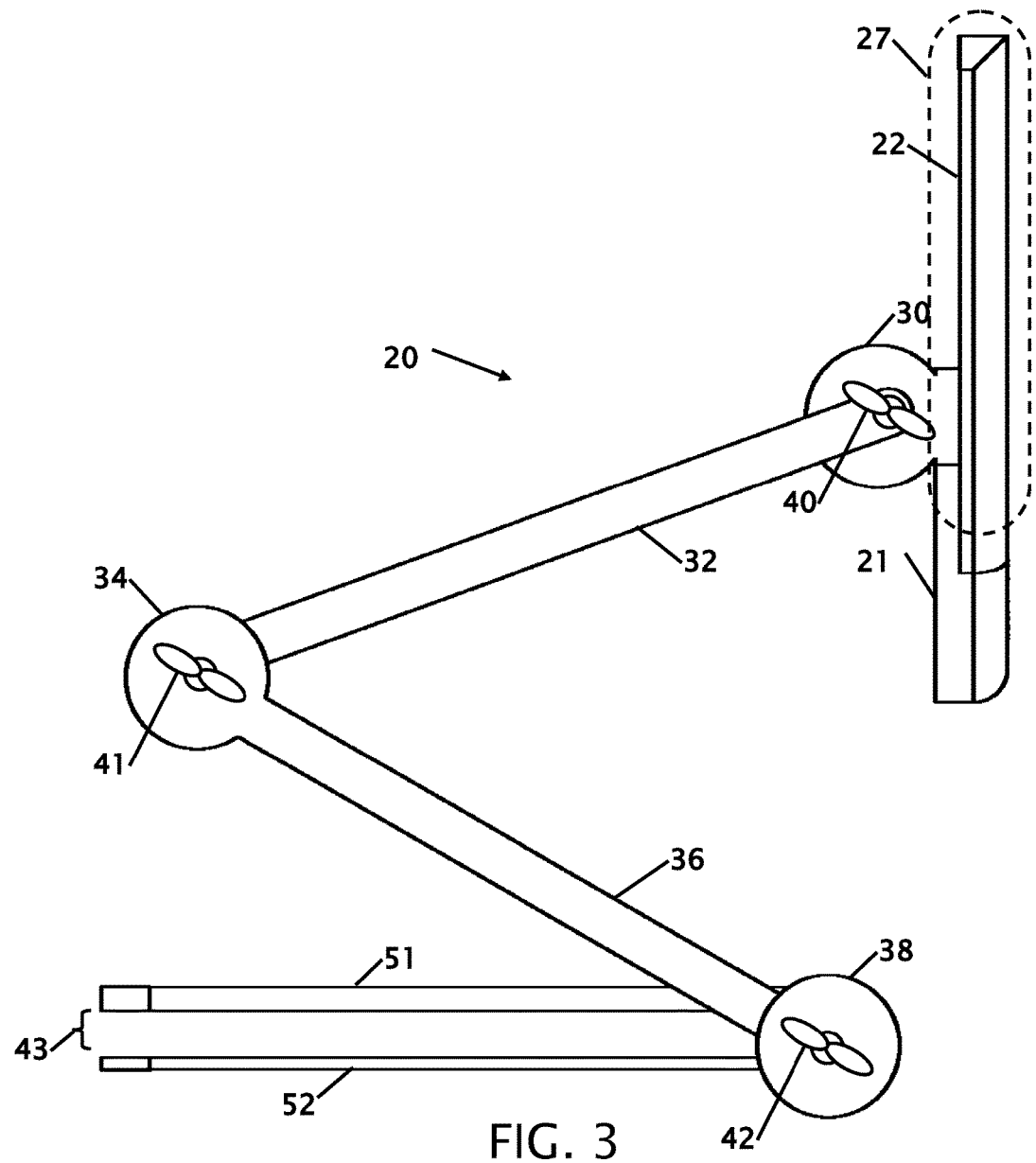
FIG. 3 shows a side view of the front facing pillow.

FIG. 3 shows a side view of the front facing pillow 20. From this side view the gap 43 that separates the upper plate 51 from the lower plate 52 is more visible. This gap 43 is adjustable to accommodate trays that may have different thicknesses. For installation the upper plate 51 is spread from the lower plate 52. The plates are then place on the side of the existing fold-down tray 49 (not shown in this figure) and then the plates 51, 52 are brought together to essentially clamp the plates 51 and 52 on the fold-down tray 49.

The upper plate 51 and the lower plate 52 pivot from front pivoting joint 38. A thumbscrew 42 provides frictional tension to the front pivoting joint 38, the upper plate 51, the lower plate 52 and arm 36. While a thumbscrew 42 is shown to provide friction, it is also contemplated that detents could be used to provide positive positioning stops. Arm 36 is connected to rear pivoting joint 34. At joint 34 another thumbscrew 41 is shown to provide frictional movement. This connection could also include detents. From joint arm 32 connects to pivoting connection 30 with a thumbscrew 40 or other friction connection to that connects to the pillow support.

The pillow support includes the cheek pads 22 connected through the "U" chin support 21. This figure shows a cover 27 that is removable and provides a covering of cushioned fabric material and can be changed to accommodate style, cushion and tactile surface features. The cover is removable to allow them to be cleaned, or replaced. They are essentially socks that slide over the ends of the side supports and can connect in the chin area to essentially cover the entire surface where the skin of a person can make contact with the front facing pillow 20.

Figure 4:
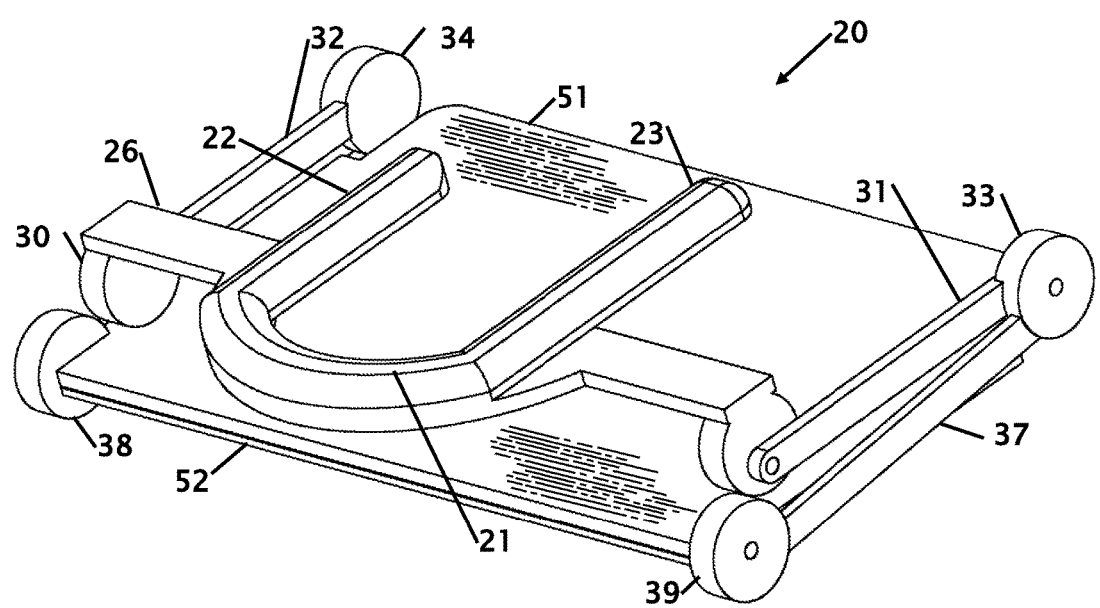
FIG. 4 shows a perspective view of the front facing pillow folded for transportation and storage.

FIG. 4 shows a perspective view of the front facing pillow 20 folded for transportation and storage. This figure shows that the front facing pillow 20 is folded to a size that approximates a laptop computer or tablet computer. The upper plate 51 and the lower plate 52 are brought together using front pivoting joints 38 and 39. The pivoting joints 38 and 39 allow arms 37 and 36 (not visible) to fold along the sides of the upper plate 51 and the lower plate 52. At the end of arms 37 and 36 rear pivoting joints 33 and 34 sit adjacent to the back of the upper plate 51 and the lower plate 52. Pivoting joints 33 and 34 have side arms 31 and 32 extending to pivoting connection 30 that has a connection 26 to the face pillow.

The face pillow is articulated back against the upper plate 51 where the "U" chin support cheek pads 22 and 23 rest in proximity to the upper plate 51. It is further contemplated that the parts can telescope together to reduce the width of the front facing pillow 20 for transportation. While this particular folded embodiment is shown and described other equivalent embodiments are contemplated that provide a support that allows a person to rest in a forward position and allows a person to fold the front facing pillow 20 in a compact package for transportation. In addition to the disclosed folding arrangement it is also contemplated to provide a telescoping adjustment for the position of the face support.

Figure 5:
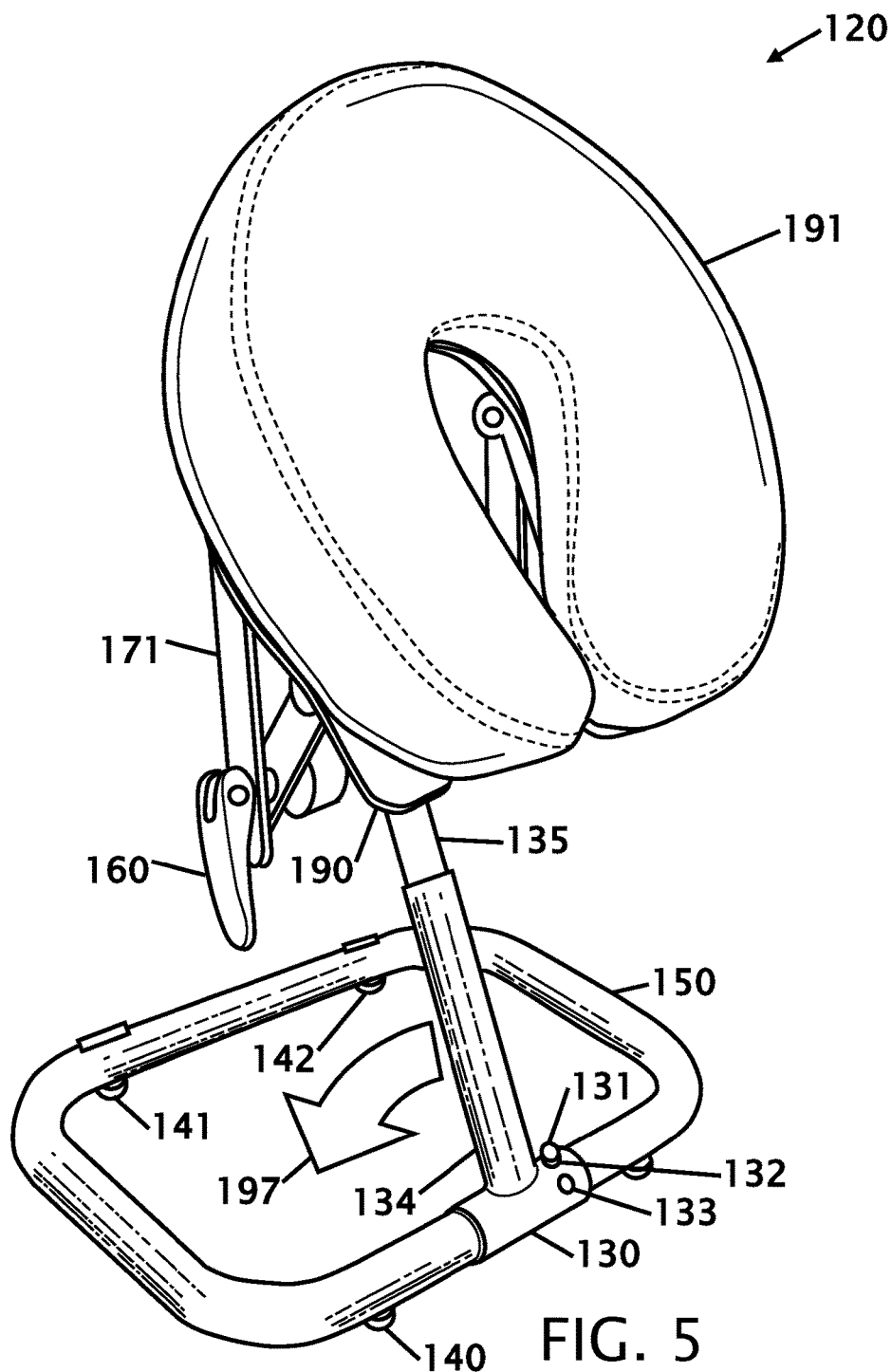
FIG. 5 shows a front perspective view of a second preferred embodiment of the front facing sitting pillow.
Figure 6:
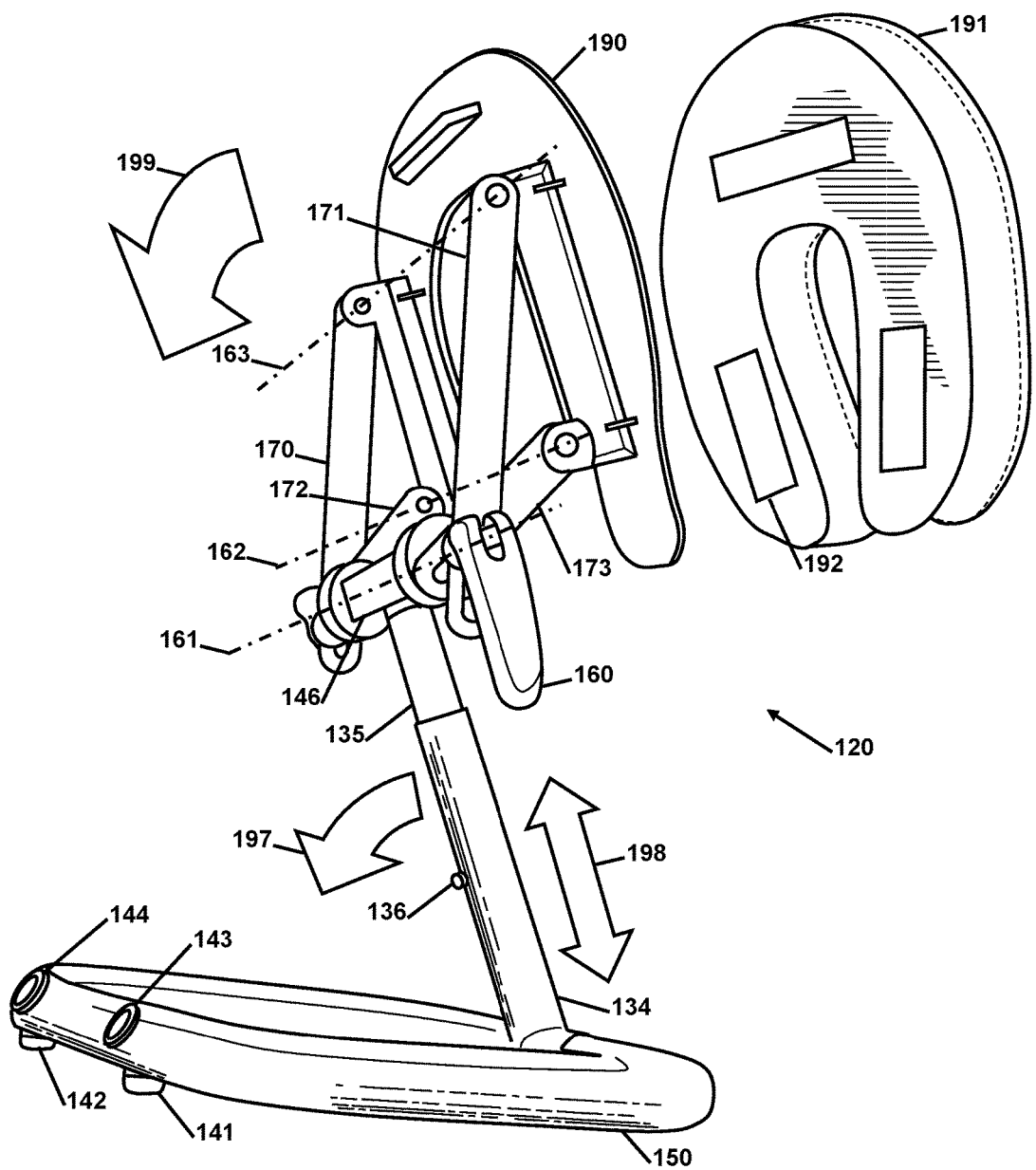
FIG. 6 shows a rear perspective view of the second preferred embodiment of the front facing sitting pillow with the pillow displaced.

FIG. 5 shows a front perspective view of a second preferred embodiment of the front facing sitting pillow 120 and FIG. 6 shows a rear perspective view of the second preferred embodiment of the front facing sitting pillow 120 with the pillow 191 displaced. In the second preferred embodiment the base tube 150 is curved to provide a base structure. The base tube has a plurality of feet or cushions 140, 141 and 142 to protect the table, desk or other supporting surface and also increases the coefficient of friction between the base tube 150 and a supporting table or desk. Fastening hardware 143 and 144 secures the feet or other elements to the base tube 150.

At the front of the base tube 150 is a tube connector 130 with a plurality of holes 132 and 133. A spring loaded button 131 allows the vertical tube member 134 to be rotated on the base tube 150 to alter an angular relationship 197 between the base tube 150 and the vertical tube member 134. While vertical tube member 134 is identified as "vertical" it should be understood that the vertical tube member 134 can be positioned at different angles other that only vertical with respect to the planar bottom created by the base tube 150.

The vertical tube 134 has in internal telescoping tube 135 that is extendable from within the vertical tube 134. The telescoping tube 135 is secured within the vertical tube 134 with another spring loaded button 136. This spring loaded button 136 is used to extend or retract 198 the pillow 191. The telescoping tube 135 is secured to a cross member 146.

The cross-member 146 extends horizontally to support arms 170, 171, 172 and 173. These support arms are secured at a first end with a clamp 160 that essentially extend from one end of the cross-member 146 to the other end of the cross-member 146. In the preferred embodiment a threaded member is used within the cross-member 146 to clamp the opposing ends with one or more nuts at both ends. In this figure, a threaded cam clamp 160 is used to allow for quick release and tightening of the cross-member 146 and the support arms 170, 171, 172 and 173. The support arms 170, 171, 172 and 173 can slide on the ends of the cross-member 146 through pivoting axle 161.

Support arms 170, 171, 172 and 173 are partially slotted at the first end and join the back of the support plate 190 at pivot locations to allow the support arms 170, 171, 172 and 173 to pivot on the back of the support plate 190 through pivoting axles 162 and 163 to change 199 the angle of the support plate 190 relative to the telescoping tube 135 and ultimately to the base tube 150 and the table or desk. The support plate 190 provides support to the face pad 191.

The face pad 191 is recurred and or optionally removable from the support plate 190 with hook-and-loop fasteners 192 or other equivalent securing mechanism. The face pad 191 is removable for cleaning, washing or replacement.

The multiple adjustments allows a person to position the face pad 191 in an optimal position for comfort of the user that wants to take a nap while facing forward. A user can place their arms on the base tube 150 to reduce movement of the base tube on the desk or table while they nap or rest.

Thus, specific embodiments of a front facing sitting pillow have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A front facing sitting pillow comprising:
a single base tube that rests on a horizontal surface;
an adjustment mechanism having a first spring loaded button that engages into at least two holes that alter an angle of a telescoping tube that connects to said single base tube;
said telescoping tube further having a second spring loaded button that engages into at least two holes that alter a length of said telescoping tube;
said telescoping tube joins to a cross-member;
said adjustment mechanism further connects to a front facing pillow;
said telescoping tube includes a vertical adjustment and said adjustment mechanism includes an angular adjustment between said single base tube and said front facing pillow, and
said front facing pillow has a support for supporting a face of a user.

2. The front facing sitting pillow according to claim 1 wherein said first spring loaded button for vertical positioning of said front facing pillow relative to said single base tube and said second spring loaded button is configured for angular positioning of said front facing pillow relative to said single base tube.

3. The front facing sitting pillow according to claim 1 wherein said cross-member has a clamping mechanism that passes through a horizontal tube portion.

4. The front facing sitting pillow according to claim 3 wherein said clamping mechanism clamps at least two supporting arms.

5. The front facing sitting pillow according to claim 4 wherein said at least two supporting arms have a first end that connects to said horizontal portion of said cross-member.

6. The front facing sitting pillow according to claim 5 wherein said at least two supporting arms have a second end that connects to a support plate.

7. The front facing sitting pillow according to claim 6 wherein said support plate has a removable connection to connect to a pillow.

8. The front facing sitting pillow according to claim 4 wherein said clamping mechanism is a threaded cam lock.

* * * * *